(12) United States Patent
Zimmer et al.

(10) Patent No.: US 7,543,287 B2
(45) Date of Patent: Jun. 2, 2009

(54) USING A BLOCK DEVICE INTERFACE TO INVOKE DEVICE CONTROLLER FUNCTIONALITY

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 11/173,007

(22) Filed: Jun. 30, 2005

(65) Prior Publication Data

US 2007/0005871 A1    Jan. 4, 2007

(51) Int. Cl.
    *G06F 9/44*    (2006.01)
(52) U.S. Cl. .................. 717/168; 717/174; 703/26; 712/224; 712/225; 712/226; 712/227; 712/209
(58) Field of Classification Search ......... 717/168–173, 717/174; 710/8–14, 62–74; 711/111; 713/100; 703/26; 712/209, 224–227
    See application file for complete search history.

(56) References Cited

U.S. PATENT DOCUMENTS

| 5,546,552 | A | * | 8/1996 | Coon et al. ............... 712/209 |
| 5,581,720 | A | * | 12/1996 | Kaba ....................... 717/168 |
| 6,047,128 | A | * | 4/2000 | Zander ..................... 717/173 |
| 6,049,672 | A | * | 4/2000 | Shiell et al. ............... 717/168 |
| 6,484,217 | B1 | * | 11/2002 | Fuente et al. ............... 710/15 |
| 6,523,083 | B1 | * | 2/2003 | Lin et al. .................. 711/103 |
| 6,574,680 | B1 | * | 6/2003 | Tangvald et al. ............ 710/10 |
| 6,691,308 | B1 | * | 2/2004 | Kasper ..................... 717/168 |
| 6,907,504 | B2 | * | 6/2005 | Burton et al. .............. 711/162 |
| 6,996,819 | B1 | * | 2/2006 | Alanis ..................... 717/173 |
| 7,181,385 | B2 | * | 2/2007 | Ganzert .................... 717/168 |
| 7,325,231 | B2 | * | 1/2008 | Tu et al. ................... 717/168 |
| 2005/0144405 | A1 | * | 6/2005 | Doran et al. ............... 711/156 |

FOREIGN PATENT DOCUMENTS

EP    1008928 A1 *    6/2000

OTHER PUBLICATIONS

Hendrics et al., "Secure Bootstrap Is Not Enough: Shoring up the Trusted Computing Base", Sep. 2004, ACM, SIGOPS European Workshop, Article No. 11, pp. 1-5.*
Matelan, Mathew N., "MPACT: Microprocessor Application to Control-Firmware Translator", Mar. 1975, ACM, SIGDA Newsletter, vol. 5, Issue 1, pp. 13-41.*

\* cited by examiner

*Primary Examiner*—Wei Y Zhen
*Assistant Examiner*—Ryan D Coyer
(74) *Attorney, Agent, or Firm*—Christopher K. Gagne (57) ABSTRACT

In one embodiment, a standard block device command is received at a device controller. The standard block device command is addressed to a virtual block device associated with the device controller. The standard block device command is to invoke functionality from the device controller unrelated to the standard block device command. The functionality invoked by the standard block device command is performed by the device controller.

17 Claims, 9 Drawing Sheets

USING A BLOCK DEVICE INTERFACE TO INVOKE DEVICE CONTROLLER FUNCTIONALITY

BACKGROUND

1. Field

Embodiments of the invention relate to the field of computer systems and more specifically, but not exclusively, to using a block device interface to invoke device controller functionality.

2. Background Information

Today's computer systems may include a variety of block devices. A block device stores information in fixed-sized blocks that are individually addressable. Common block sizes are 512 bytes, 1 kilobyte (KB), 2 KB, and 4 KB. Storage disks are a common type of block device.

Often, a device controller is used to access a corresponding block device. Read-write commands issued to a block device may be handled by the device controller. Such device controller commands may be standardized for a particular block device interface, such as the Advanced Technology Attachment (ATA) interface.

However, device controller tasks, such as a device controller firmware update, do not use standard read-write interface commands to the data blocks of the block device. Usually, customized interfaces, that use unique control and status registers, are used to affect such specialized hardware functionality of the device controller. Such customized hardware interfaces require considerable development and deployment expense.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Block devices are typically used as mass storage devices. For example, the most common block device is a hard disk drive. Other common block devices include optical storage devices, removable storage media devices (e.g., Universal Serial Bus (USB) Flash drives), and floppy drives.

Figure 1:
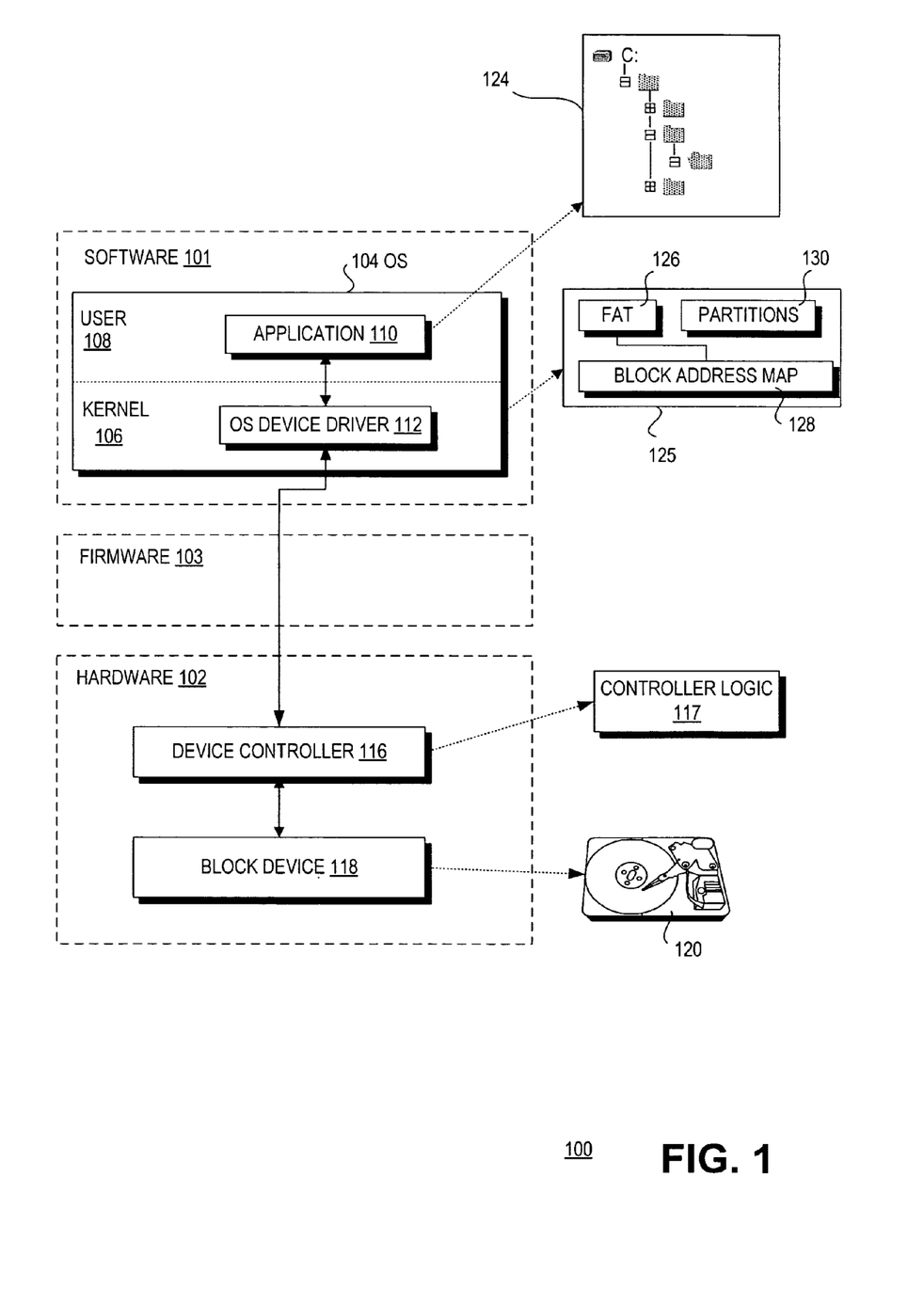
FIG. 1 is a block diagram illustrating a block device interface in accordance with one embodiment of the present invention.

Referring to FIG. 1, an architecture of a computer system 100 to support embodiments of the invention is shown. System 100 is divided into three major portions: software 101, firmware 103, and hardware 102. Software 101 includes an operating system (OS) 104 having a kernel space 106 and user space 108. An application 110 runs in the user space 108, while an OS device driver 112 resides at the kernel level 106 of OS 104.

Firmware 103, also referred to as the Basic Input/Output System (BIOS), is layered between software 101 and hardware 102. In a typical computer architecture, the initialization and configuration of the computer system by firmware is commonly referred to as the pre-boot phase. The pre-boot phase is generally defined as the time between a processor reset and loading of an Operating System (OS). At the start of pre-boot, it is up to the code in the firmware to initialize the platform to the point that an operating system loaded off of media, such as a hard disk, can take over. The start of the OS load begins the period commonly referred to as OS runtime. During OS runtime, the firmware may act as an interface between software and hardware components of a computer system as well as handle system-related tasks. As computer systems have become more sophisticated, the operational environment between the OS level and the hardware level is generally referred to as the firmware or the firmware environment.

Embodiments of firmware 103 described herein may be implemented substantially in compliance with the Extensible Firmware Interface (EFI) (Extensible Firmware Interface Specification, Version 1.10, Dec. 1, 2002.) EFI enables firmware, in the form of firmware modules, such as drivers, to be loaded from a variety of different resources, including flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the

*Intel® Platform Innovation Framework for EFI Architecture Specification—Draft for Review*, Version 0.9, Sep. 16, 2003, referred to hereafter as the "Framework". It will be understood that embodiments of the present invention are not limited to the "Framework" or implementations in compliance with the EFI specification.

In one embodiment, firmware 103 is loaded during the pre-boot phase of computer system 100. In one embodiment, firmware 103 may reside on a non-volatile storage, such as Flash memory. In an EFI-compliant embodiment, firmware 103 may be loaded from a disk storage during pre-boot.

Hardware 102 includes a device controller 116, and a block device 118, such as a hard disk drive 120. Device controller 116 may be an integrated component of a system's chipset, or may reside on an expansion card placed in a bus slot, such as Peripheral Component Interface (PCI) slot. In one embodiment, device controller 116 handles storage and retrieval tasks associated with block device 118 to free up processing time for a Central Processing Unit (CPU) of computer system 100.

Device controller 116 includes controller logic 117. In one embodiment, controller logic 117 includes hardware logic implemented as an integrated circuit, such as an Application Specific Integrated Circuit (ASIC). In another embodiment, the controller logic 117 includes instructions stored in non-volatile storage and executed by a processor of device controller 116.

A file system 125 may abstract the data stored on block device 118 for an application 110 in user space 108. File system 125 may be depicted as a file tree 124 for users of application 110. The underlying file data are addressed as blocks on block device 118 using Logical Block Addressing (LBA) (discussed further below in conjunction with FIG. 8). In LBA, a storage device is divided into consecutively numbered blocks without regard to the underlying media, such as cylinders and sectors of a hard disk.

Components of computer system 100 translate "files" as presented to the user to physical data on block device 118. File system 125 may include a File Allocation Table (FAT) 126, which maps files and folders to corresponding storage blocks via a block address map 128. In addition, a partition table 130 may also be used to create logical partitions, such that the same physical block device may appear to applications running in operating system 104 as separate storage devices.

OS device driver 112 may advertise standard Application Program Interfaces (APIs) to applications, such as application 110. For example, application 110 may call a READ_FILE function using a handle to a particular file. File system 125 translates the read request to logical blocks. File system 125 may search a buffer for the requested blocks. If the blocks are not present, then file system 125 may issue an I/O control (IOCTL) request to OS device driver 112 to read data from the block device 118. OS device driver 112 fulfills the request by accessing the block device through device controller 116.

Embodiments of the present invention use standard OS and device controller command structures to abstract functionality from a device controller instead of performing storage-related activity with a block device. In one embodiment, a virtual block device is presented to the OS by a device controller. Block device commands may be sent to the virtual block device using services inherent in the OS. However, the device controller recognizes block device commands addressed to the virtual block device as being associated with functionality and not storage to the block device. Thus, standard controller command interfaces may be used to achieve non-storage related functionality from a device controller. Embodiments of such functionality include performing a firmware update, obtaining a device controller event log, and reporting a hardware identifier.

Figure 2:
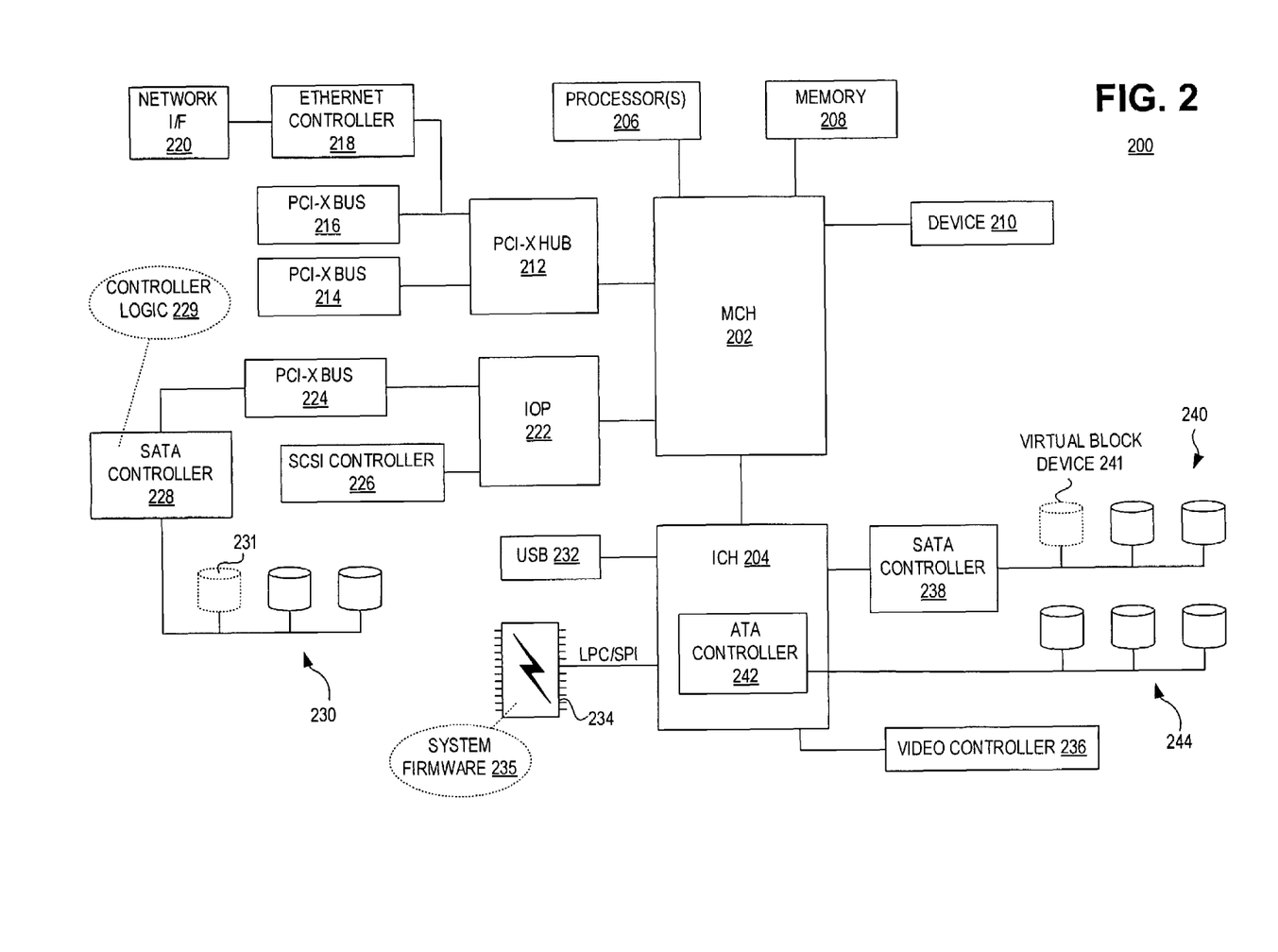
FIG. 2 is a block diagram illustrating a computer system architecture in accordance with one embodiment of the present invention.

Turning to FIG. 2, a computer system 200 in accordance with one embodiment of the present invention is shown. In one embodiment, computer system 200 includes a server. While FIG. 2 shows an architecture promulgated by the Intel® Corporation, it will be understood that embodiments of the invention are not limited to implementation on such an architecture. In one embodiment, various components described below may be mounted to a server board. Other components may fit into slots or sockets of such a server board.

Embodiments described herein use Advanced Technology Attachment (ATA) (see ATA family of standards published by the InterNational Committee on Information Technology Standards (INCITS), T13 Technical Committee), Serial Advanced Technology Attachment (SATA) (see *Serial ATA: High Speed Serialized AT Attachment*, version 1.0a, Jan. 7, 2003), and Small Computer System Interface (SCSI) interfaces (see SCSI family of standards published by the American National Standards Institute (ANSI)). However, it will be understood that embodiments herein are not limited to such block device interface standards.

System 200 includes a Memory Controller Hub (MCH) 202 coupled to an Input/Output Controller Hub (ICH) 204. One or more processors 206 are coupled to MCH 202. In one embodiment, processor(s) 206 includes a Xeon® processor manufactured by the Intel® Corporation. Memory 208 is also coupled to MCH 202. A device 210 may be coupled to MCH 202 using Peripheral Component Interconnect (PCI) Express.

A PCI-X hub 212 may also be coupled to MCH 202. PCI-X bus 214 and 216 may be coupled to PCI-X hub 212. An Ethernet controller 218 may also be coupled to PCI-X hub 212 which in turn is coupled to a network interface 220.

An I/O processor (IOP) 222 may be coupled to MCH 202. A SCSI controller 226 may be coupled to IOP 222. A PCI-X bus 224 may be coupled to IOP 222.

SATA controller 228 may be coupled to PCI-X bus 224. In one embodiment, SATA controller 228 is a PCI card that fits into a PCI slot of a board. SATA controller 228 may also be referred to as a Host Bus Adapter (HBA). SATA controller 228 may be coupled to one or more block devices 230. In the embodiment of FIG. 2, block devices 230 include a virtual block device 231. FIG. 2 also shows SATA controller 228 includes controller logic 229.

ICH 204 may include an ATA controller 242 coupled to one or more storage devices 244. Universal Serial Bus ports 116 may be coupled to ICH 204. A non-volatile storage 234, such as Flash memory, is coupled to ICH 204. Non-volatile storage 234 may be coupled to ICH 204 via a Low Pin Count (LPC), a Serial Peripheral Interface (SPI), or the like. A video controller 236 may also be coupled to ICH 204.

A SATA controller 238 may be coupled to ICH 204. In one embodiment, SATA controller 238 may be mounted to a server board that also has mounted MCH 202 and ICH 204. Block devices 240 may be coupled to SATA controller 238. Block devices 244 include a virtual block device 241. Virtual block device 241 may not correspond to a real storage device.

The device controllers may be mounted to the same board as MCH 202 and ICH 204. In one embodiment, in such a configuration, the device controller is considered an integrated controller. In other embodiments, a device controller is coupled to a board by way of an expansion slot, such as PCI slot.

In one embodiment, block devices 230, 240, and 244 may include one or more storage disks. Such storage disks include magnetic disks or optical disks. In other embodiments, block devices coupled to a device controller may be implemented as a Redundant Array of Independent Disks (RAID). In such an embodiment, the device controller may also be referred to as a RAID controller.

Figure 3:
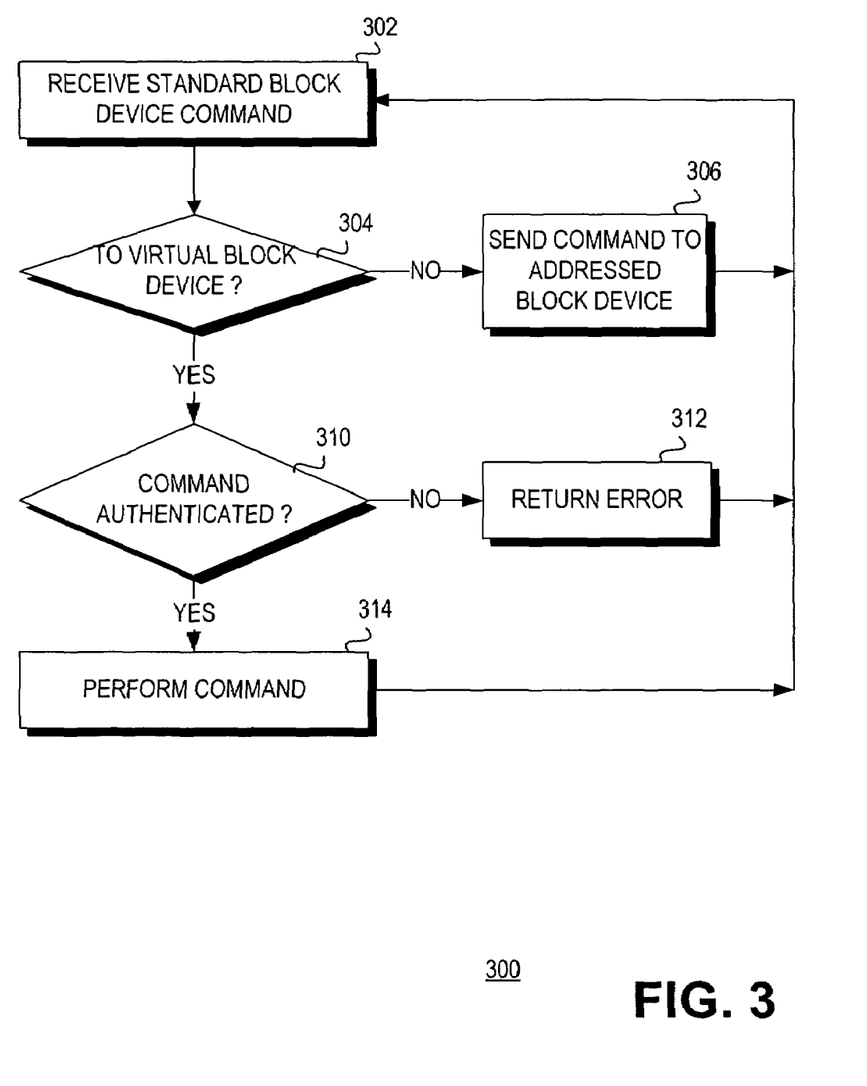
FIG. 3 is a flowchart illustrating the logic and operations to use a block device interface to invoke device controller functionality in accordance with one embodiment of the present invention.

Turning to FIG. 3, a flowchart 300 in accordance with an embodiment of the present invention is shown. In one embodiment, the logic of flowchart 300 may be implemented in the controller logic of a device controller.

Starting in a block 302, a standard block device command is received at the device controller. In one embodiment, device controller commands are loaded into command registers of the device controller. The controller logic will access the command registers and perform the tasking. In another embodiment, command packets may be used for commands that use parameters that exceed the command registers. Commands common to device controllers include READ, WRITE, and RESET commands.

Standard block device commands refer to commands that are standard to OS device drivers and device controllers. OS device drivers must comply with a standard interface so that the OS and applications can make standardized calls to the OS device driver.

In Microsoft® Windows®, OS device drivers for block devices respond to block device I/O control codes to interface properly with the Windows FAT file system. Some block device I/O control codes for a disk drive are shown below in Table 1.

TABLE 1

Block device I/O control codes

| I/O Control Code | Description |
| --- | --- |
| IOCTL_DISK_READ | Reads data from the block device. |
| IOCTL_DISK_WRITE | Writes data to the block device. |
| IOCTL_DISK_DEVICE_INFO | Returns storage info to block device drivers. |
| IOCTL_FORMAT_MEDIA | Formats at a low level or reformats to the block device. |

An OS device driver for the device controller translates OS calls into calls specific to the logic of the device controller. Since OS device drivers are accessing device controller registers, OS device drivers usually run in kernel space.

Commands may be issued to the block device by loading the Command Block registers of the device controller with the required parameters and then loading the corresponding command code to the Command register. Command Block registers are typically 8-bit or 16-bit registers. Commands to ATA, SATA, and SCSI controllers have been standardized by various standards bodies as described above, such an ANSI.

In one embodiment, the virtual block device may be represented as a block device, such as a CD-ROM or Digital Versatile Disk (DVD), in a device manager, such as Windows Device Manager. The virtual block device may be assigned a drive letter. If the virtual block device is partitioned (discussed below in conjunction with FIG. 8), then each partition may be presented as a separate drive letter.

In other embodiments, the virtual block device may be set with protections rules so that if a user attempts to format or read/write to the virtual block device, the device controller will respond with an error to the user.

Proceeding to a decision block 304, the controller logic determines if the command is addressed to the virtual block device. If the answer to decision block 304 is no, then the logic continues to a block 306 to send the command to the addressed block device. If the answer is yes, then the logic proceeds to a decision block 310.

At decision block 310, the logic determines if the standard block device command is authenticated. The standard block device command may be authenticated as a security measure to ensure sensitive functionality, such as a firmware update, is authorized. Embodiments of authentication measures may include public/private keys, certificates, a preshared key, or the like. Authentication measures also include determining whether the application has privileges to access the virtual block device. For example, a user trying to save a word processing document to the virtual block device would not have privileges to access the virtual block device.

If the answer to decision block 310 is no, then the logic proceeds to a block 312 to return an error and then returns to block 302. If the answer to decision block 310 is yes, then the controller logic proceeds to a block 314 to perform the standard block device command to invoke functionality from the device controller. After block 314, the logic returns to block 302.

As will be described further below, the device controller will perform particular functionality associated with the LBA of the block device command. This functionality may have no connection to the actions normally associated with the standard block device command. The standard block device command is used as a tool to invoke specialized functionality that the device controller is aware of. The functionality invoked may not involve storage related actions that result in touching the block device media or communicating with the block device.

Further, since embodiments herein use standard block device commands, a hardware vendor (or manufacturer) does not have to provide tailored hardware interfaces to perform the desired functionality. Embodiments herein do not require knowledgeable complicity from the OS since the OS only "sees" standard block device commands and need not be aware of the true functionality performed by the device controller.

For example, a vendor does not have to write and install a specific kernel mode device driver for a device controller firmware update. In accordance with embodiments herein, the vendor may use a pre-existing OS-block device infrastructure for performing the device controller firmware update.

Figure 4:
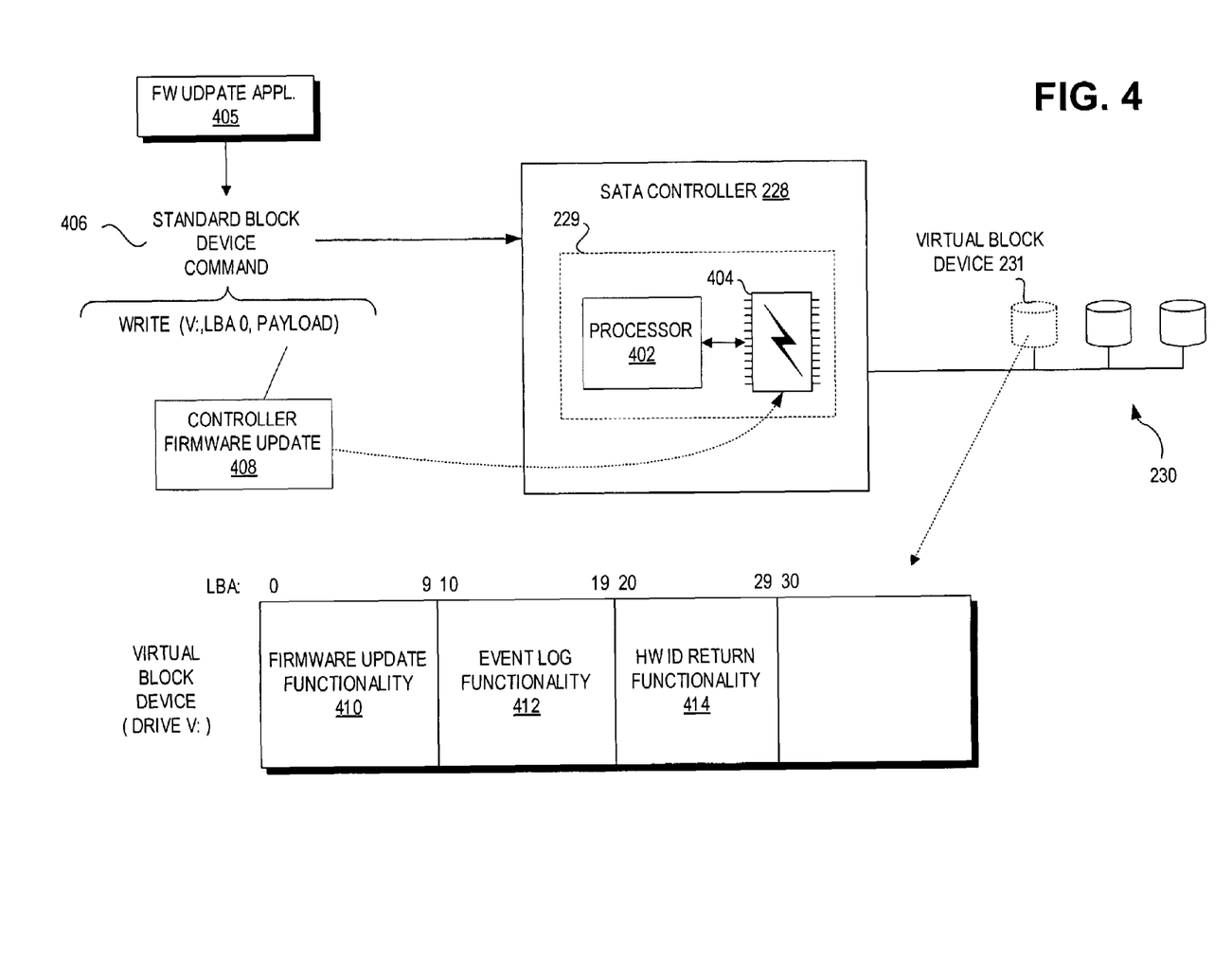
FIG. 4 is a block diagram illustrating using a block device interface to invoke device controller functionality in accordance with one embodiment of the present invention.

Referring to FIGS. 4-7, embodiments of using standard block device commands to invoke functionality from a device controller will be discussed. In FIG. 4, an embodiment of updating the firmware of SATA controller 228 is shown. Controller logic 229 of SATA controller 228 includes a processor 402 and a non-volatile storage device 404, such as Flash memory. Instructions executable by processor 402 are stored in non-volatile storage device 404.

SATA controller 228 receives a standard block device command 406. In one embodiment, command 406 is initiated by an application running on the computer system. Such an application may include a firmware update application 405 provided by the manufacturer of SATA controller 228. A user may obtain a controller firmware update 408, for example, by downloading the firmware update over the Internet.

Controller firmware update 408 may be sent to the controller wrapped in a standard block device command 406, such as the payload section of a write command. In this way, a specialized interface does not have to be constructed to perform the firmware update.

In FIG. 4, command 406 is shown as WRITE (V:, LBA 0, PAYLOAD) for illustrative purposes. In this example, the WRITE command uses the drive letter V: for the virtual block device. One of ordinary skill in the art will appreciate how embodiments herein may be tailored for the standard command format of a particular device controller. The payload of command 406 is the controller firmware update 408.

When SATA controller 228 receives command 406, controller logic 229 proceeds through normal procedures in interpreting command 406. However, when the controller logic 229 determines that the target drive for command 406 is virtual block device 231, then controller logic 229 knows that command 406 is to invoke functionality from SATA controller 228.

In the embodiment of FIG. 4, command 406 is also addressed to a specific logical block address of the virtual block device 231. In FIG. 4, the LBAs of virtual block device 231 have been allocated to particular functionalities. In the embodiment of FIG. 4, LBAs 0 to 9 are associated with firmware update functionality 410, LBAs 10 to 19 are associated with event log functionality 412, and LBAs 20 to 29 are associated with hardware identification return functionality 414. Alternative embodiments include allocation of virtual block device 231 to one or more functionalities, and further, embodiments of the invention are not limited to the functionalities described herein.

In one embodiment, at least a portion of the logic of each functionality 410, 412, and 414 is located at controller logic 229 of SATA controller 228. In this embodiment, instructions stored on non-volatile storage 404 provide the functionality when invoked by the standard block device command to the virtual block device.

Figure 5:
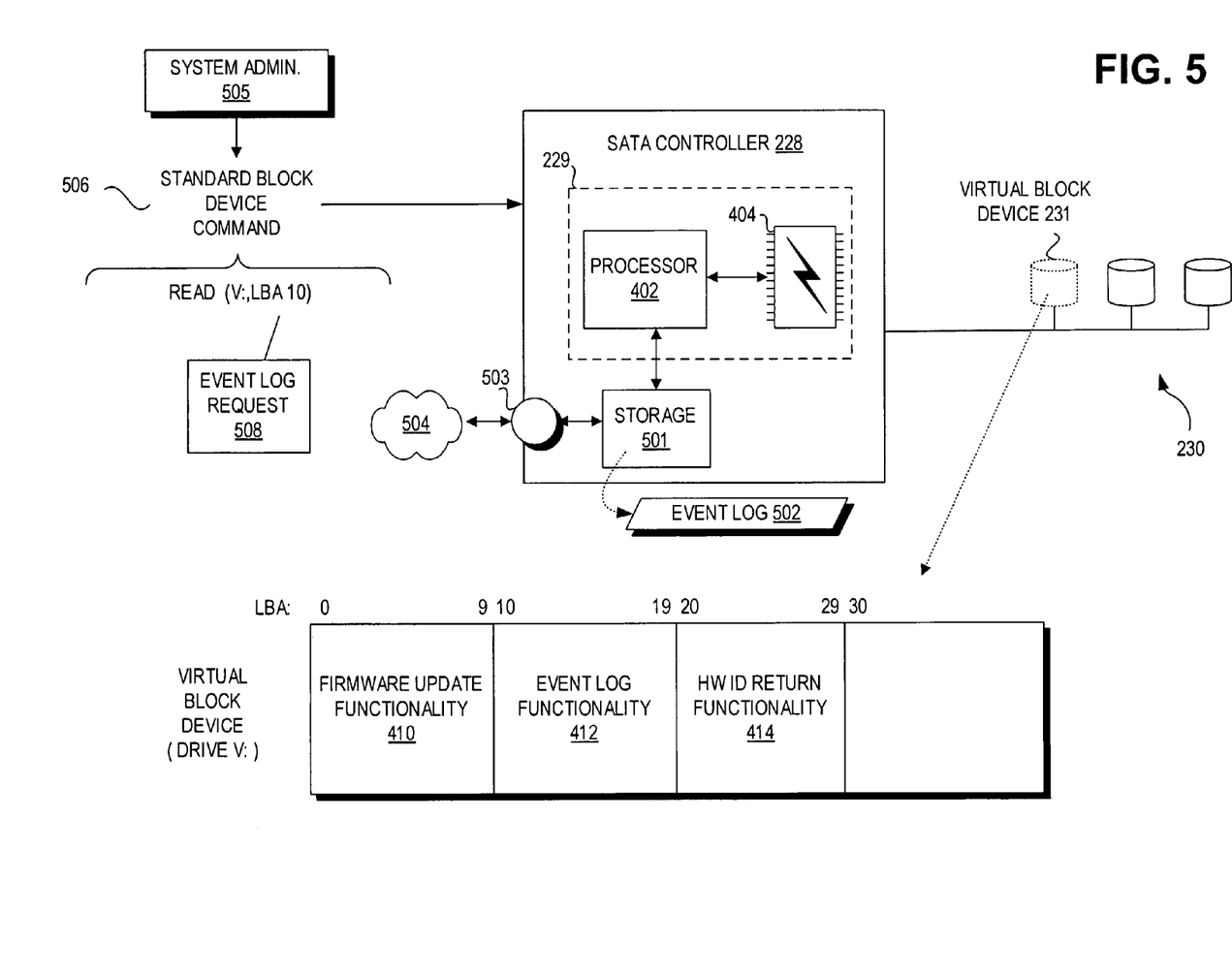
FIG. 5 is a block diagram illustrating using a block device interface to invoke device controller functionality in accordance with one embodiment of the present invention.

Turning to FIG. 5, an embodiment of obtaining an event log by SATA controller 228 is shown. Standard block device command 506 is received by SATA controller 228. Command 506 is addressed to the LBA 10 of virtual block device 231 that is associated with event log functionality 412.

In one embodiment, a system administrator application 505 may send command 506 to obtain an event log 502 from storage 501 of SATA controller 228. In an alternative embodiment, a system event log may be obtained from the OS by SATA controller 228. In another embodiment, the event log request functionality 414 may invoke a network interface 503 of SATA controller 228 to send event log 502 across network 504 back to the manufacturer of SATA controller 228. In this particular embodiment, SATA controller 228 has a "phone home" functionality that may be initiated by standard block device commands.

Figure 6:
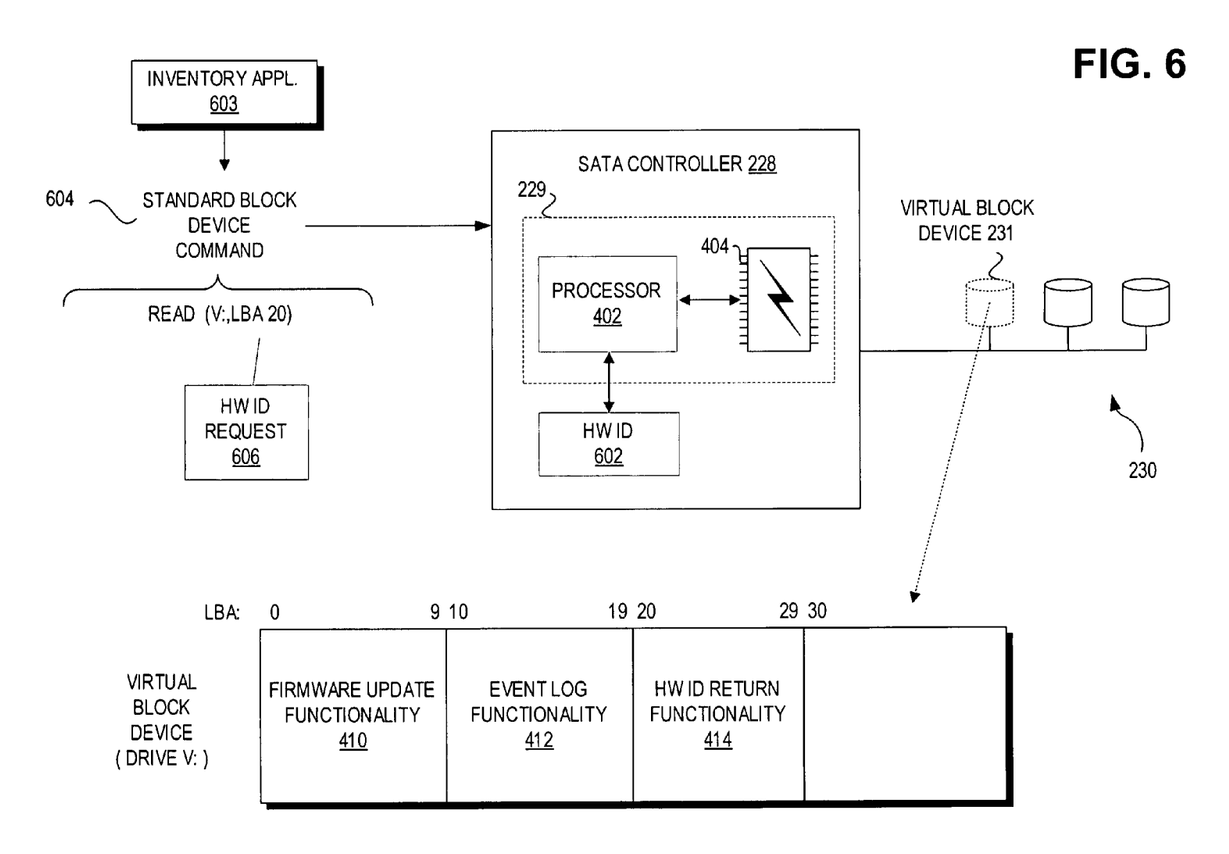
FIG. 6 is a block diagram illustrating using a block device interface to invoke device controller functionality in accordance with one embodiment of the present invention.

Turning to FIG. 6, an embodiment of a hardware identification return functionality is shown. Standard block device command 604 is sent to controller 228. Command 604 is addressed to an LBA of virtual block device 231 associated with a hardware identification return functionality 414.

When controller logic 229 determines that the command 604 is addressed to the hardware identification return functionality 414, the controller logic 229 obtains a hardware identification 602 of SATA controller 228 and returns the hardware identification 602 to an application 603. In one embodiment, hardware identification 602 includes a Media Access Control (MAC) address of network interface 503 of SATA controller 228. In another embodiment, hardware identification 602 includes a serial number or other unique identifying feature of SATA controller 228 and/or block devices 230.

In one embodiment, the hardware identification functionality may be called by an inventory application 603. A system administrator may wish to use such an application to inventory hardware that is part of a network or enterprise. The hardware identifications may be returned to the inventory application 603 for cataloging.

Figure 7:
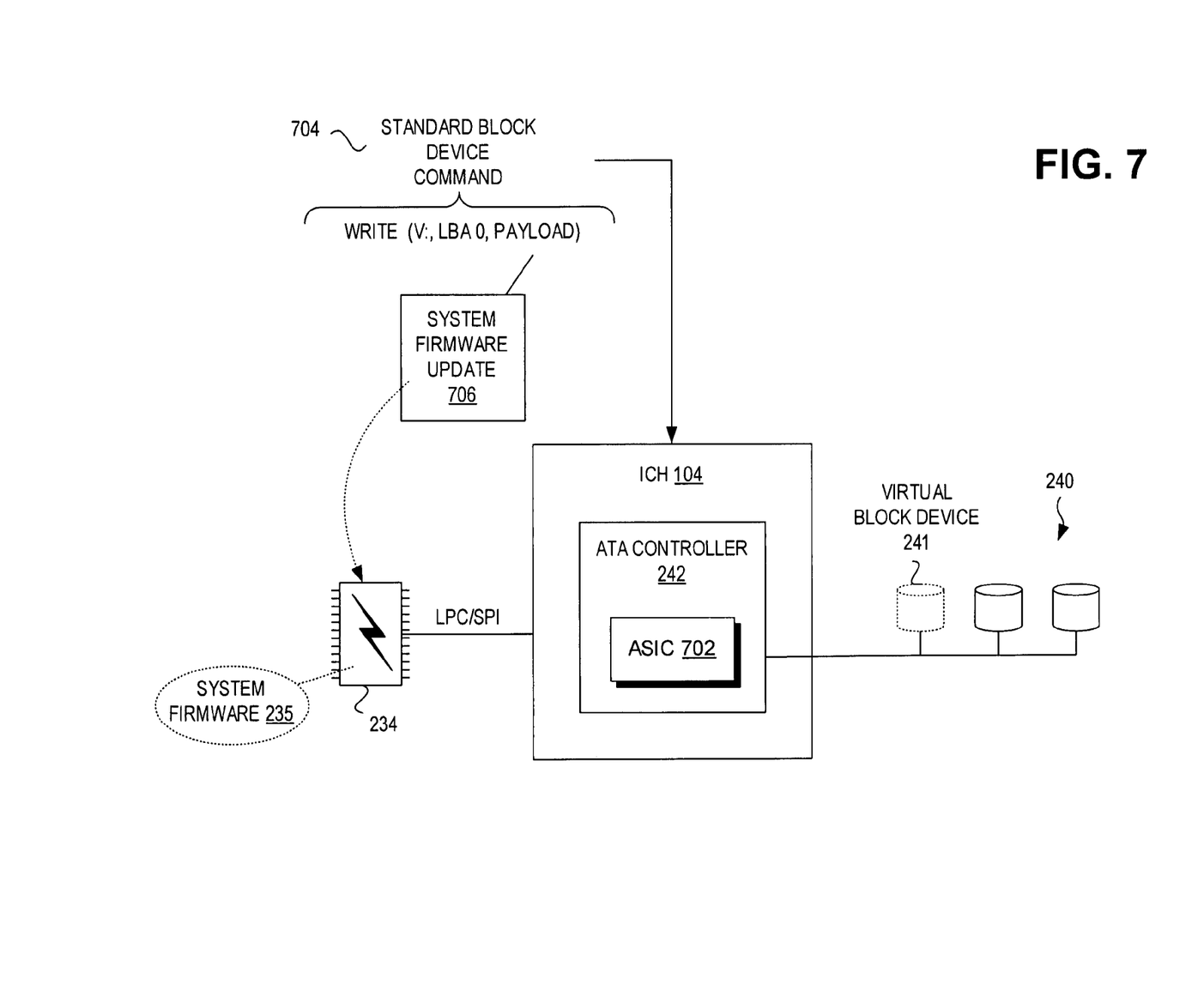
FIG. 7 is a block diagram illustrating using a block device interface to invoke device controller functionality in accordance with one embodiment of the present invention.

Turning to FIG. 7, an embodiment to update the system firmware of a computer system in accordance with embodiments herein is shown. A standard block device command 704 is received at ICH 104. The payload of command 704 includes the system firmware update 706.

In the embodiment of FIG. 7, the controller logic of ATA controller 242 is implemented as hardware logic, such as ASIC 702. As described similarly above, command 704 is addressed to system firmware update functionality of virtual block device 241. In this embodiment, the system firmware update 706 is to update the system firmware 235 stored on non-volatile storage 234.

Figure 8:
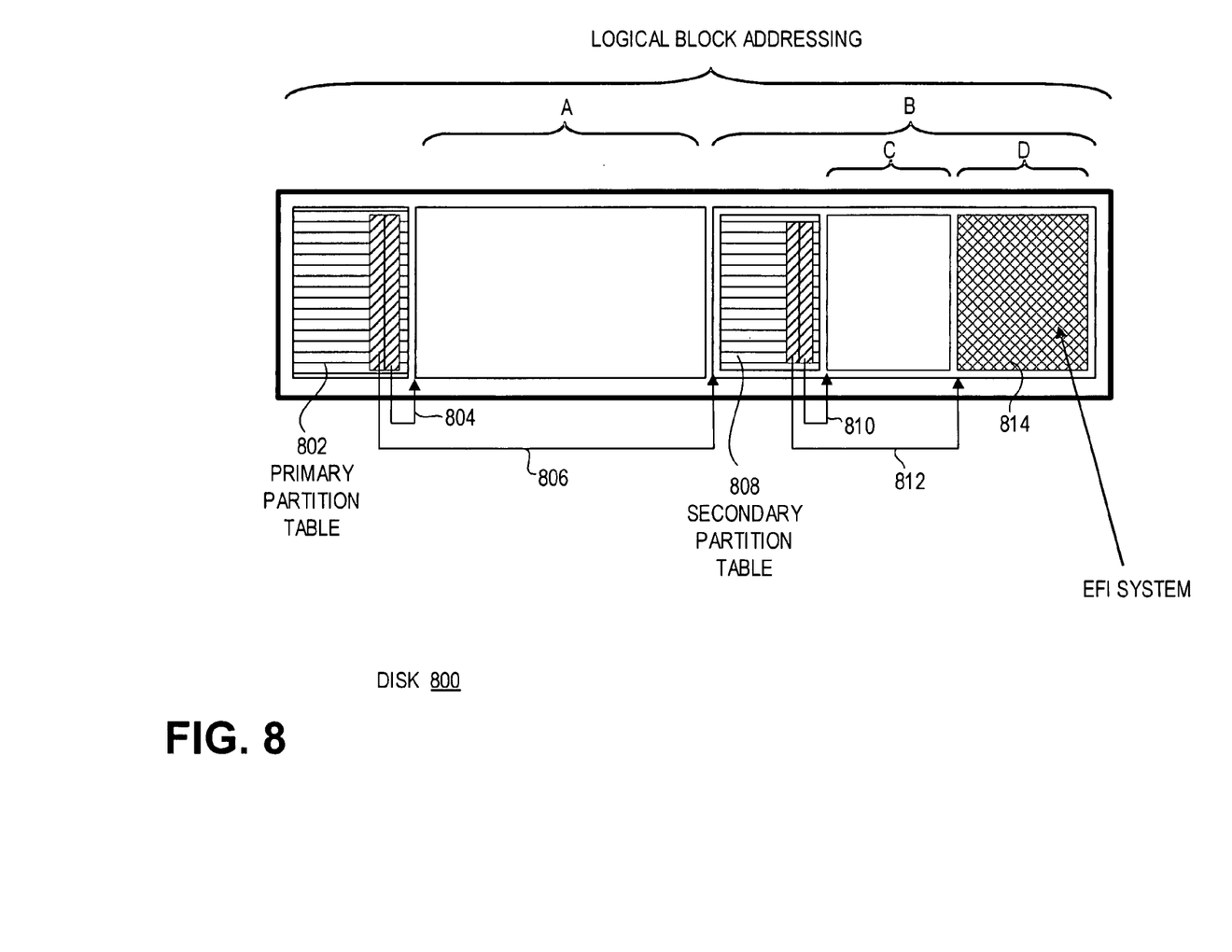
FIG. 8 is a block diagram illustrating logical block addressing to support a block device interface to invoke device controller functionality in accordance with one embodiment of the present invention.

An embodiment of a partitioning scheme of a block storage device is shown in FIG. 8. The partitioning scheme corresponds to a disk 800 having a sequential range of logical block address space over its entirety. The block address space of a physical drive may be divided into one or more logical partitions. For example, under Windows®-based operating systems, a physical drive can be divided into up to four primary logical partitions. In the illustrated embodiment, two primary partitions A and B are shown. In turn, a primary partition may be logically divided into multiple secondary partitions, as depicted by secondary partitions C and D.

In one embodiment of the invention, a virtual block device may be represented as having partitions. In this embodiment, the virtual block device may appear to the system as multiple drives.

Disk 800 includes a primary partition table 802. Primary partition table 802 stores information defining the primary partitions on disk 800. This information includes pointers 804 and 806, which identify the base addresses of primary partitions A and B, respectively. In a similar manner, each primary partition may include a secondary partition table when that primary partition is logically divided into secondary partitions. A secondary partition table 808 is illustrated in FIG. 8. As before, secondary partition table 808 may store a set of pointers to the base addresses of the respective secondary partitions, as depicted by pointers 810 and 812.

In the illustrated example of FIG. 8, secondary partition D is defined as an EFI system partition (ESP) 814. In general, an EFI system partition may be used to extend the functionality of the firmware supplied on a system's boot firmware device, such as Flash memory 234. At least a portion of a system's firmware may be stored in an EFI system partition.

Figure 9:
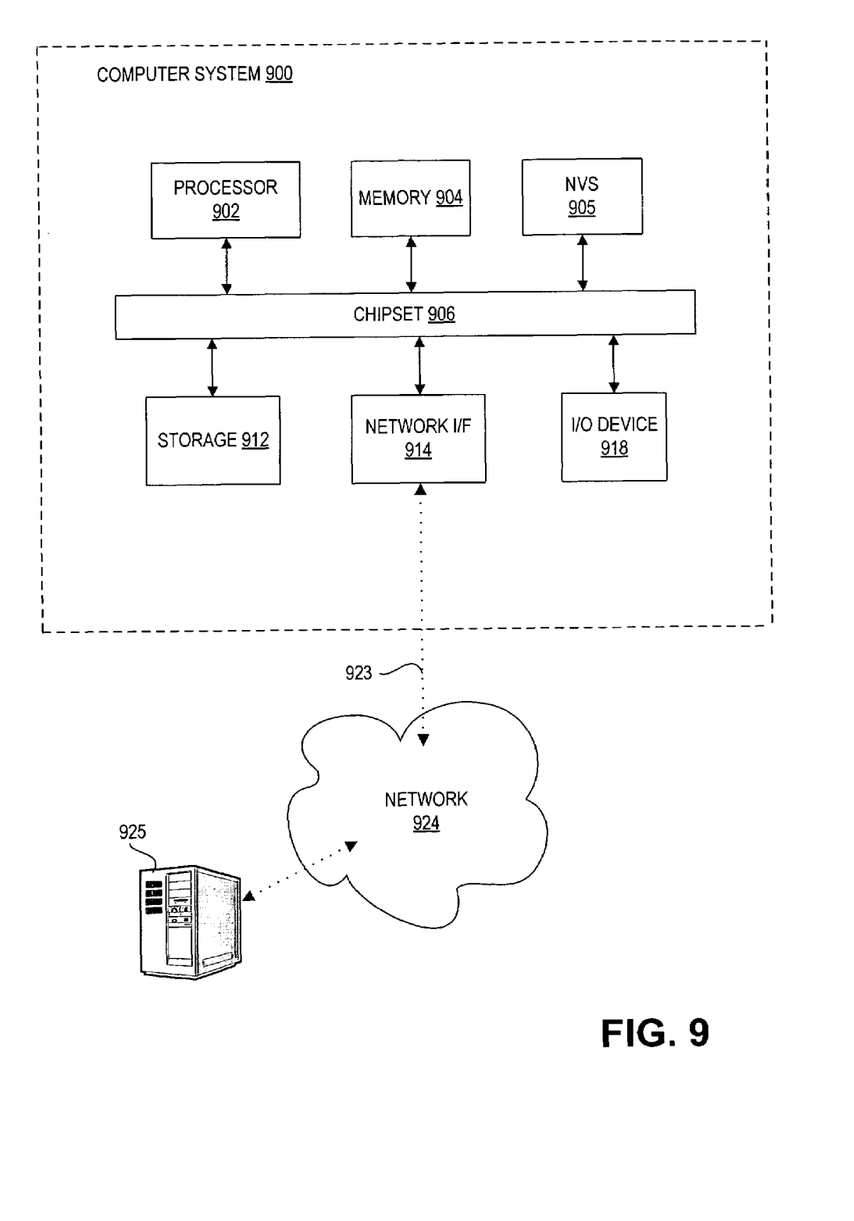
FIG. 9 is a block diagram illustrating one embodiment of a computer system to implement embodiments of the present invention.

FIG. 9 is an illustration of one embodiment of an example computer system 900 on which embodiments of the present invention may be implemented. Computer system 900 includes a processor 902 and a memory 904 coupled to a chipset 906. Storage 912, Non-Volatile Storage (NVS) 905, network interface (I/F) 914, and Input/Output (I/O) device 918 may also be coupled to chipset 906. Embodiments of computer system 900 include, but are not limited to, a desktop computer, a notebook computer, a server, a personal digital assistant, a network workstation, or the like. In one embodiment, computer system 900 includes processor 902 coupled to memory 904, processor 902 to execute instructions stored in memory 904.

Processor 902 may include, but is not limited to, an Intel® Corporation x86, Pentium®, Xeon®, or Itanium® family processor, or the like. In one embodiment, computer system 900 may include multiple processors. In another embodiment, processor 902 may include two or more processor cores.

Memory 904 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 904 may include one or more memory units that do not have to be refreshed.

Chipset 906 may include a memory controller, such as a Memory Controller Hub (MCH), an input/output controller, such as an Input/Output Controller Hub (ICH), or the like. In an alternative embodiment, a memory controller for memory 904 may reside in the same chip as processor 902. Chipset 906 may also include system clock support, power management support, audio support, graphics support, or the like. In one embodiment, chipset 906 is coupled to a board that includes sockets for processor 902 and memory 904.

Components of computer system 900 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 918 may include a keyboard, a mouse, a display, a printer, a scanner, or the like.

Computer system 900 may interface to external systems through network interface 914. Network interface 914 may include, but is not limited to, a modem, a Network Interface Card (NIC), or other interfaces for coupling a computer system to other computer systems. A carrier wave signal 923 may be received/transmitted by network interface 914. In the embodiment illustrated in FIG. 9, carrier wave signal 923 is used to interface computer system 900 with a network 924, such as a Local Area Network (LAN), a Wide Area Network (WAN), the Internet, or any combination thereof. In one embodiment, network 924 is further coupled to a computer system 925 such that computer system 900 and computer system 925 may communicate over network 924.

Computer system 900 also includes non-volatile storage 905 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 912 includes, but is not limited to, a magnetic disk drive, a magnetic tape drive, an optical disk drive, or the like. It is appreciated that instructions executable by processor 902 may reside in storage 912, memory 904, non-volatile storage 905, or may be transmitted or received via network interface 914.

It will be appreciated that in one embodiment, computer system 900 may execute Operating System (OS) software. For example, one embodiment of the present invention utilizes Microsoft Windows® as the operating system for computer system 900. Other operating systems that may also be used with computer system 900 include, but are not limited to, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.). In addition, a machine-accessible medium may include propagated signals such as electrical, optical, acoustical or other forms of propagated signals (e.g., carrier waves, infrared signals, digital signals, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   receiving a block device storage operation command at a device controller, the device controller configured to control one or more block devices, the command including a virtual block device address and a respective logical block address, the virtual block device address interpreted by the device controller such that the virtual block device invokes a respective function other than a storage operation involving the one more block devices, the respective function being selected from a plurality of functions, the plurality of functions being associated with respective different logical block addresses; and
   performing the respective function, wherein the respective function comprises updating controller firmware stored in the device controller, and the command includes payload that includes undated firmware to be stored in the device controller.

2. The method of claim 1 wherein logic to perform the plurality of functions is comprised in the device controller.

3. The method of claim 1, further comprising authenticating the command before performing the respective function.

4. The method of claim 1 wherein the plurality of functions include performing the updating controller firmware stored in the device controller; obtaining an event log; and reporting a hardware identifier.

5. The method of claim 1 wherein the respective function comprises sending a device controller event log to a destination.

6. The method of claim 1 wherein the respective function comprises: retrieving a hardware identifier assigned to the device controller; and sending the hardware identifier to a destination.

7. The method of claim 1 wherein the device controller includes one of an Advanced Technology Attachment (ATA)

disk controller, a Serial Advanced Technology Attachment (SATA) disk controller, or a Small Computer System Interface (SCSI) disk controller.

8. An article of manufacture, comprising:
a machine-accessible memory storing a plurality of instructions which when executed perform operations comprising:
receiving a block device storage operation command at a device controller, the device controller configured to control one or more block devices, the command including a virtual block device address and a respective logical block address, the virtual block device address interpreted by the device controller such that the virtual block device invokes a respective function other than a storage operation involving the one more block devices, the respective function being selected from a plurality of functions, the plurality of functions being associated with respective different logical block addresses; and
performing the respective function, wherein the respective function comprises updating a system firmware stored in a system firmware device coupled to the device controller, the command including payload that includes undated firmware to be stored in the system firmware device.

9. The article of manufacture of claim 8 wherein the plurality of functions include: updating a controller firmware stored in the device controller; obtaining an event log; and reporting a hardware identifier.

10. The article of manufacture of claim 8 wherein the respective function includes: sending a device controller event log to a destination.

11. The article of manufacture of claim 8 wherein the respective function includes: retrieving a hardware identifier assigned to the device controller; and sending the hardware identifier to a destination.

12. The article of manufacture of claim 8 wherein execution of the plurality of instructions further perform operations comprising: authenticating the command before performing the respective function.

13. A system, comprising:
a hard disk drive; and
a device controller coupled to the hard disk drive, the device controller including controller logic to receive a block device storage operation command the device controller configured to control the hard disk drive, the command including a virtual block device address and a respective logical block address, the virtual block device address interpreted by the device controller such that the virtual block device invokes a respective function other than a storage operation involving the hard disk drive, the respective function being selected from a plurality of functions, the plurality of functions being associated with respective different logical block addresses, and the controller logic also configured to perform the respective function, wherein the respective function comprises updating controller firmware stored in the device controller, and the command includes payload that includes undated firmware to be stored in the device controller.

14. The system of claim 13 wherein the plurality of functions comprise: updating a controller firmware stored in the device controller; obtaining an event log; and reporting a hardware identifier.

15. The system of claim 13 wherein the controller logic is also to authenticate the command before performing the respective function.

16. The system of claim 13 wherein the controller logic is implemented as an integrated circuit.

17. The system of claim 13 wherein the controller logic is implemented as a processor coupled to non-volatile storage, the non-volatile storage having stored instructions that when executed by the processor embody the controller logic.

* * * * *

UNITED STATES PATENT AND TRADEMARK OFFICE
CERTIFICATE OF CORRECTION

PATENT NO. : 7,543,287 B2  Page 1 of 1
APPLICATION NO. : 11/173007
DATED : June 2, 2009
INVENTOR(S) : Vincent J. Zimmer et al.

It is certified that error appears in the above-identified patent and that said Letters Patent is hereby corrected as shown below:

In column 10, line 49, in Claim 1, delete "undated" and insert -- updated --, therefor.

In column 10, line 56, in Claim 4, after "include" delete "performing the".

In column 10, line 60, in Claim 5, delete "comprises" and insert -- comprises: --, therefor.

In column 11, line 25, in Claim 8, delete "undated" and insert -- updated --, therefor.

In column 12, line 23, in Claim 13, delete "undated" and insert -- updated --, therefor.

Signed and Sealed this

Fourth Day of August, 2009

JOHN DOLL
*Acting Director of the United States Patent and Trademark Office*